United States Patent
Cruickshank et al.

[11] Patent Number: 6,108,343
[45] Date of Patent: Aug. 22, 2000

[54] DYNAMICALLY RECONFIGURABLE DSP ARCHITECTURE FOR MULTI-CHANNEL TELEPHONY

[75] Inventors: Brian Cruickshank, Oakville; Rene M. Mueller, Toronto, both of Canada

[73] Assignee: Nortel Networks Corporation, Montreal, Canada

[21] Appl. No.: 08/995,165

[22] Filed: Dec. 19, 1997

[51] Int. Cl.⁷ ........................................ H04J 3/16
[52] U.S. Cl. ..................... 370/437; 370/259; 370/465; 370/484; 370/290; 375/377
[58] Field of Search ................... 370/259, 286, 370/288, 290, 291, 347, 437, 465, 484, 471, 488; 375/308, 377

[56] References Cited

U.S. PATENT DOCUMENTS

| | | | |
|---|---|---|---|
| 5,018,136 | 5/1991 | Gollub | 370/471 |
| 5,497,373 | 3/1996 | Hulen et al. | 370/79 |
| 5,592,480 | 1/1997 | Carney et al. | 370/347 |
| 5,721,730 | 2/1998 | Genter | 370/288 |
| 5,859,883 | 1/1999 | Critchlow | 375/377 |

*Primary Examiner*—Douglas W. Olms
*Assistant Examiner*—Shick Hom

[57] ABSTRACT

A method and apparatus for providing multi-channel telephony multimedia services. A multi-tasking DSP processes a plurality of multimedia services for a plurality of telephone channels. The DSP operates in conjunction with a host processor. The host processor indicates to the DSP, in real-time, the services required for a channel. The DSP in response allocates a portion of its fast memory in which a program is stored comprising the multimedia services routines required for the channel. The multimedia services program stored in the portion of fast memory allocated to a channel is then utilized to process the incoming channel signal data. The processed signal data is then output to memory shared between the DSP and the host processor. The portion of memory and the program for each channel can be dynamically reconfigured in real-time on a per channel basis.

14 Claims, 2 Drawing Sheets

DYNAMICALLY RECONFIGURABLE DSP ARCHITECTURE FOR MULTI-CHANNEL TELEPHONY

BACKGROUND OF THE INVENTION

This invention relates to a method of providing multi-channel telephony services and to signal processing apparatus for a multi-channel telephony system.

A variety of services may be required by telephone calls such as speech recognition, dual tone multi-frequency (DTMF) tone detection, voice playback and recording, and facsimile transmission and reception. These services may be provided through digital processing.

U.S. Pat. No. 5,497,373 issued Mar. 5, 1996 to Hulen describes a multimedia interface for a multi-channel telephony system. The interface comprises a central processing unit (CPU), shared memory, and a plurality of digital signal processors (DSPs). The shared memory stores signal processing programs used in providing services, such as voice recognition. A host messaging center downloads a service map for the telephone channels to the shared memory as a service table. The CPU identifies services required for each channel from this service table and, for each different required service, identifies a DSP to perform the service and downloads a program for processing the service from shared memory to the identified DSP's on-chip memory. In this way, one signal processing program may be stored in each DSP so that each DSP may process the required service for a number of telephone channels. Thus, where, for example, a telephone channel requires the services of voice messaging and dual tone multifrequency (DTMF) tone recognition, one DSP will be downloaded with a program to provide voice messaging signal processing and another DSP will be downloaded with a program to provide DTMF tone recognition signal processing. Further, each of these two DSPs will provide these services to other channels requiring these services.

A drawback with this approach is that if all of the DSPs are engaged in signal processing, a new service cannot be provided for a channel without overwriting a signal processing program in a DSP. This impacts other channels for which the DSP had been providing signal processing. To reduce the likelihood of this occurring, the number of DSPs may be increased, however, this increases the cost of the multimedia interface.

This invention seeks to overcome drawbacks of prior multi-channel signal processing apparatus.

SUMMARY OF INVENTION

According to the present invention, there is provided a method of providing multi-channel telephony services, comprising the steps of:

(a) receiving an indication of a telephone call on a channel and services required for said telephone call;

(b) based on said required services indication, allocating a portion of a fast memory to said channel and uploading a program for processing said required services from slow memory into said allocated portion of fast memory;

(c) accessing said allocated portion of fast memory with a digital signal processor (DSP) and executing said program with said DSP in order to process said services; and (d) repeating steps (a) through (c) as required, with said DSP executing programs for different telephone calls in a time shared fashion.

According to another aspect of the present invention, there is provided signal processing apparatus for a multi-channel telephony system comprising: a digital signal processor (DSP) adapted for operative association with a host processor; a fast memory addressed by said DSP; a slow memory associated with said fast memory; said DSP for:

(i) receiving from said host processor an indication of a plurality of telephone calls on a like plurality of channels and services required for each telephone call;

(ii) for each channel of said plurality of channels, based on the required services indication for said each channel, allocating a portion of said fast memory to said each channel and uploading a program for processing said each channel required services from said slow memory into said allocated portion of fast memory;

(iii) in a time shared fashion amongst said plurality of channels, accessing each allocated portion of fast memory and executing said program stored therein in order to process said services.

BRIEF DESCRIPTION OF THE DRAWINGS

In the figures which illustrate preferred embodiments of the invention.

DETAILED DESCRIPTION OF THE PREFERRED EMBODIMENTS

Figure 1:
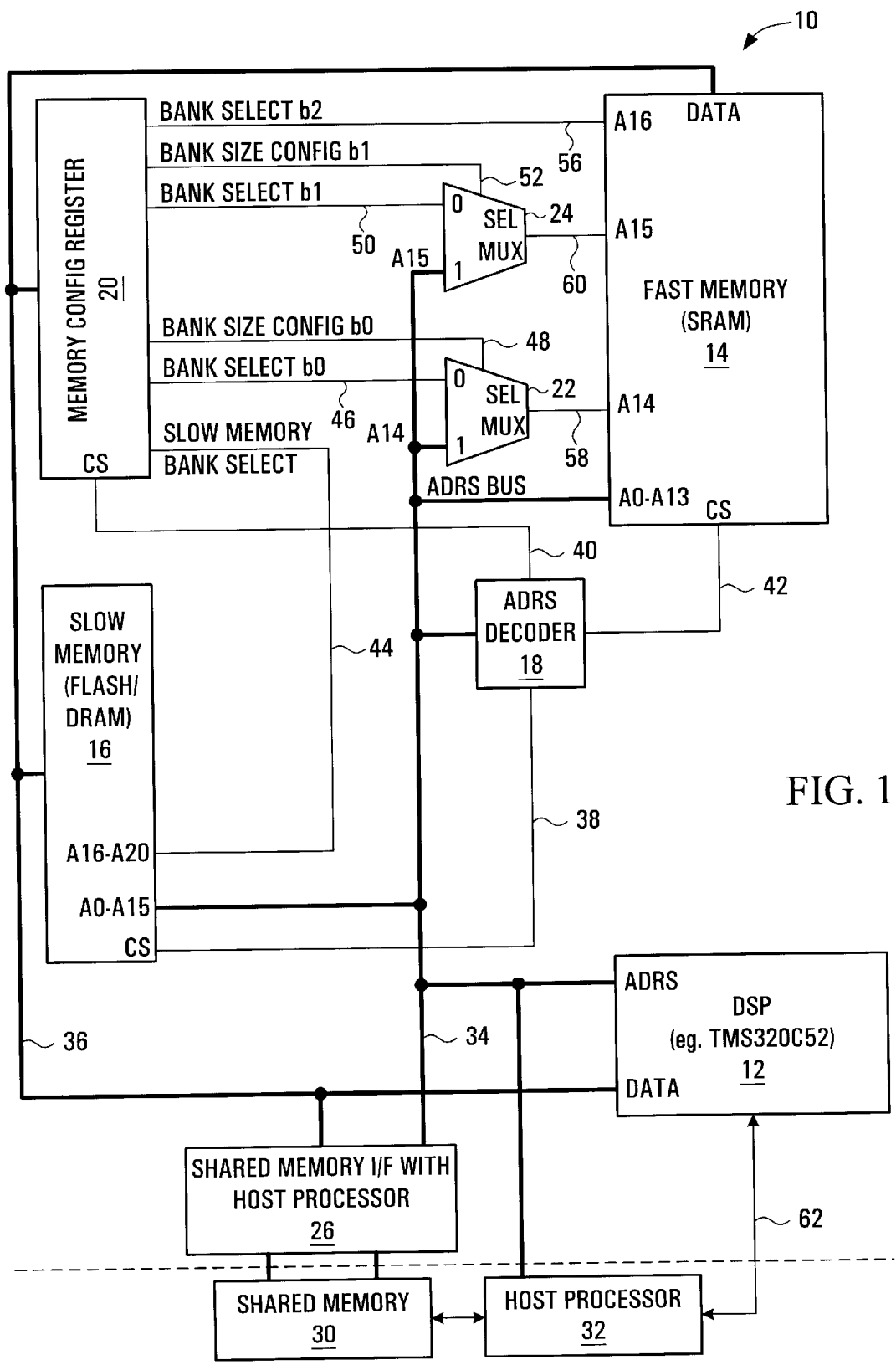
FIG. 1 is a schematic diagram of multi-channel signal processing apparatus made in accordance with this invention.

Turning to FIG. 1, an exemplary multi-channel signal processing apparatus indicated generally at 10 comprises a DSP 12, a fast memory 14, a slow memory 16, an address decoder 18, a memory configuration register 20, multiplexers 22 and 24, and an interface 26 to a dual ported shared memory, indicated at 30, which is shared with a host processor, indicated at 32.

All of the programs for processing services are stored in the slow memory 16, which may be flash memory or DRAM. In the embodiment described, the DSP has sixteen address lines (A0 to A15) allowing it to address sixty-four thousand words (64 kW). Preferably the DSP is a model TMS320C52 by Texas Instruments. The shared memory 30 may comprise DRAM; the fast memory may comprise SRAM and, in the described embodiment, has seventeen address lines allowing it to store 128 kW.

An address bus 34 connects the sixteen address lines of the DSP 12 to the interface 26, the address decoder 18, and to the slow memory. The bus also connects the first fourteen address lines (A0 to A13) of the DSP to the fast memory, the next address line (A14) to multiplexer 22 and the last address line (A15) to multiplexer 24. The host processor 32 is also connected directly to the address bus so that it may address the slow memory. A data bus 36 connects the DSP and the interface to the memory configuration register and slow and fast memories. The address decoder outputs on lines 38, 40, and 42 to the slow memory, memory configuration register, and fast memory, respectively. The memory configuration register outputs on line 44 to the slow memory, on bank select line 46 and bank size configuration line 48 to multiplexer 22, on bank select line 50 and bank size configuration line 52 to multiplexer 24, and on bank select line 56 to address A16 the fast memory. Multiplexer 22 outputs on address line 58 to address A14 of the fast memory and multiplexer 24 outputs on address line 60 to address A15 of the fast memory. The DSP outputs to the host processor on interrupt line 62.

Figure 2:
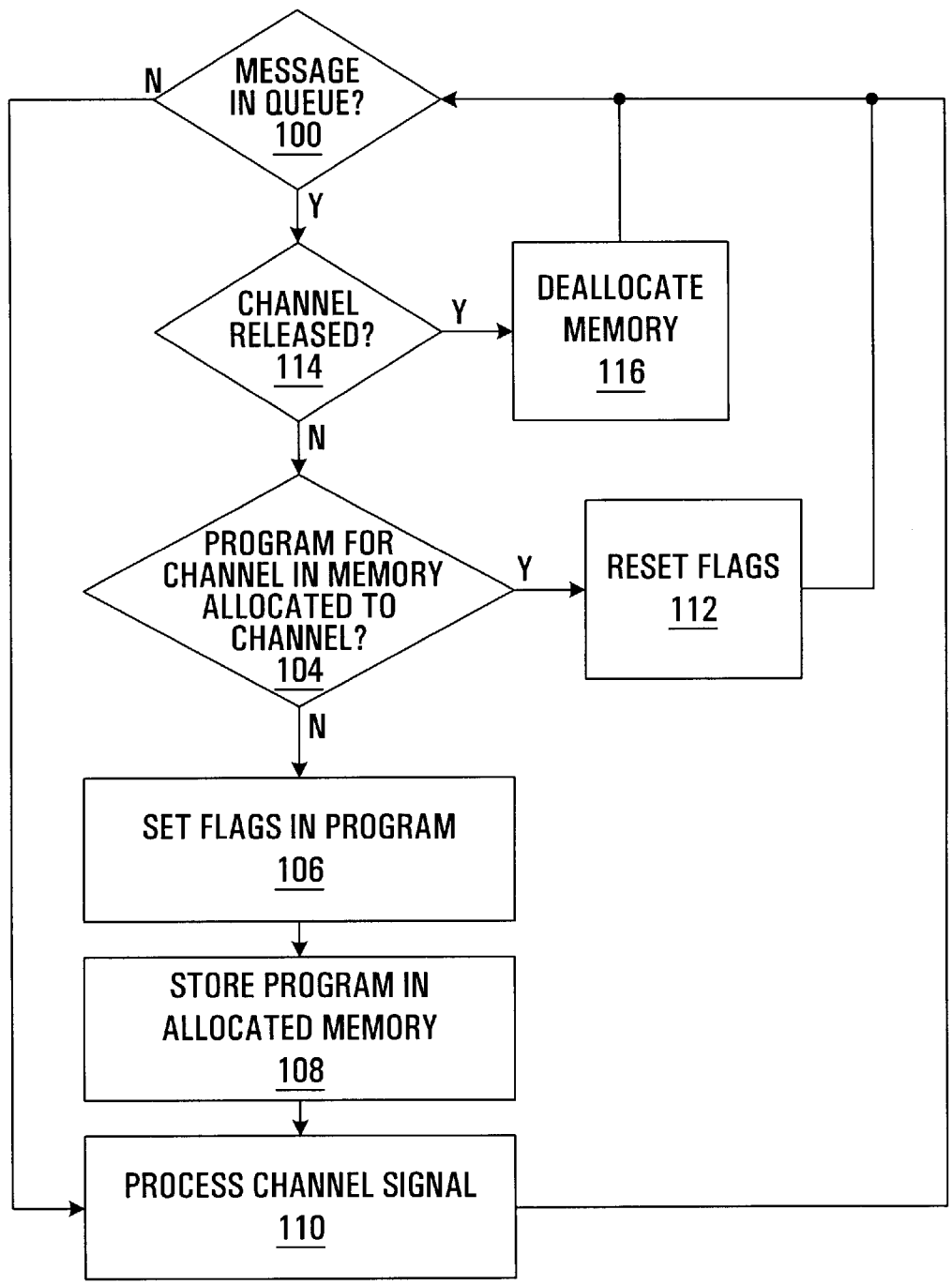
FIG. 2 is a flow diagram illustrating the operation of the DSP of FIG. 1.

Operation of the signal processing apparatus 10 is described in conjunction with FIG. 2, which is a flow diagram for the DSP, along with FIG. 1. Referring to these figures, whenever a new telephone call on a channel arrives at the host processor, the processor adds a message to a "host-to-DSP" queue in shared memory 30 to indicate the channel, the services required by the channel, and the size of the program which provides these services. The DSP polls this queue (block 100) and on finding a message therein, recognizes the new channel and, based on the size of the associated program, allocates a memory bank in the fast memory 14 for the program (block 106). In this regard, the DSP may select a memory bank size of 16 kW, 32 kW, or 64 kW. The host processor then addresses the slow memory such that the requisite program is passed to the data bus 36 and the DSP addresses the fast memory (utilising the address decoder, memory configuration register and multiplexers) such that the program is stored in the allocated bank of the fast memory (block 108). More particularly, to configure the fast memory 14 for a given bank size, the DSP 12 writes a bit pattern in the memory configuration register 20 in order to set or clear bank size configuration lines 48 and 52, as follows:

| Mem Bank Size | Bank Size Confg Line 48 | Bank Size Confg Line 52 |
|---|---|---|
| 16 kW | 0 | 0 |
| 32 kW | 1 | 0 |
| 64 kW | 1 | 1 |

When bank size configuration line 48 is set to a value of 0, address line 58 to address A14 of the fast memory 14 is driven by bank select line 46. When bank size configuration line 48 is set to a value of 1, address A14 of the fast memory is driven by the DSP's address line A14. Similarly, when bank size configuration memory line 52 is set to a value of 0, address line 60 to address A15 of the fast memory is driven by bank select line 50 and when line 52 is set to 1, address A15 of the fast memory is driven by the DSP's address line A15. (The delay through the multiplexers 22, 24 is sufficiently low to ensure that when the DSP's address lines are passed through to the fast memory, the fast memory has enough time to access the memory location specified by the address without requiring the DSP to delay processing in order to wait for the access to complete.) The DSP can specify which portion of the fast memory it wishes to access by writing a bit pattern into memory configuration register 20 which sets or clears bank select lines 46, 50, and 56. In this way the DSP can fully utilize a fast memory with an addressing space larger than the addressing capabilities of the DSP.

Once a program is stored in fast memory, the host processor passes the incoming signal from the channel to the shared memory and the DSP processes the signal utilising the program stored in fast memory for this purpose, outputting the processed signal back to shared memory and sending an interrupt to the host on line 62 so that the host will retrieve the processed signal (block 110).

When another new call arrives on another channel, the process is repeated, with the DSP storing the program to process the services required for the new call in a different bank of memory in the fast memory. Note in this regard that if the second new call requires the same services as the first new call, the program for processing these services will be stored twice in fast memory: once in the bank of memory allocated to the first new call and once in the bank of memory allocated to the second new call.

All of the services processed for one channel are processed by one program in fast memory. Each program allows processing of a group of services normally associated with a single channel. For example, one program may process voice messaging and DTMF signalling. If a particular channel requires only voice messaging, this will be apparent to the DSP from the table in shared memory. With this information, the DSP may set a flag in the program which is stored in the memory bank of fast memory allocated to that channel to disable DTMF signal processing (block 106).

The operating system for the DSP is multi-tasking, processing services for various channels on a time shared basis. Therefore the limit to the number of channels which may be handled by the DSP is set by the size of the fast memory.

During the pendency of a call, the services required by a channel may change. When this occurs, the host processor updates the service table in shared memory and determines whether the new services are part of the existing program which is processing services for the channel. If yes, the host processor adds a message to the host-to-DSP queue in shared memory. In response, the DSP notes the new services and resets previously set flags in the program stored in the memory bank of fast memory allocated to that channel so that the program will allow processing of the new services (blocks 104 and 112). If the new services are not part of the existing program processing services for the channel, the host processor sends a message to the host-to-DSP queue with information concerning the new program. The DSP, based on the size of the new program, may allocate a different memory bank size to the channel and, after the host processor loads the new program to the data bus from the slow memory, stores the new program into the newly allocated memory bank for the channel. In this regard, the DSP will either overwrite the previous allocated portion of memory for this channel with the new program or another free area of fast memory. The portions of the fast memory allocated to other channels are not touched.

When a call ends, the host processor sends a message to the host-to-DSP queue to indicate the channel has been released. In response the DSP deallocates the fast memory bank which had been allocated to that channel (blocks 114 and 116) which frees this memory for other uses. When memory is freed, the DSP may also defragment data in the fast memory.

With the foregoing operation it will be apparent that when services for a particular channel change, the signal processing apparatus may be dynamically reconfigured without impacting calls on the other channels. Further, because of the different memory bank sizes in which a program may be stored in fast memory, fast memory use may be optimized.

It will also be apparent that, in operation, each channel has its own bank of fast memory, its own area of shared memory, and its own portion of DSP computing power.

It will be appreciated that the described architecture can be modified so that the DSP can specify smaller bank sizes by supplying additional multiplexers for other lower order address lines of the DSP (A13, A12, etc.). The architecture may also be expanded by increasing the size of the fast memory and providing bank select lines from the memory configuration register for the additional high order fast memory address lines (A17 and up).

DSPs with larger addressing capabilities are known (e.g., DSPs are known with 32 bit address lines); such DSPs could work with a larger fast memory. However, the present invention has application wherever the number of possible programs to be executed by the DSP exceed the size of the available fast memory (and the size of the on-chip memory of the DSP). In this regard, because DSPs with larger addressing capabilities are more expensive, it may often be desirable to employ the teachings of the subject invention rather than incur the expense of employing the more expensive DSP.

Other modifications will be apparent to those skilled in the art and, therefore, the invention is defined in the claims.

What is claimed is:

1. A method of providing multi-channel telephony services, comprising:
    a. receiving an indication of a telephone call on a channel and services required for said telephone call;
    b. based on said required services indication, allocating a portion of a fast memory to said channel and uploading a program for processing said required services from slow memory into said allocated portion of fast memory;
    c. accessing said allocated portion of fast memory with a digital signal processor "DSP" and executing said program with said DSP in order to process said services; and
    d. repeating steps a. through c. at least once so as to allocate different portions of said fast memory to different channels, with said DSP executing programs for different telephone calls in a time shared fashion.

2. The method of claim 1 wherein a given program for a given telephone call on a given channel comprises an initial program and including the steps of receiving an indication of different services required for said given telephone call on said given channel and uploading a different program for processing said different required services from slow memory into said allocated portion of fast memory for said given channel, such that said different program may overwrite said initial program but leaves programs for processing services for other telephone calls intact, whereby services for any telephone call may be changed without impacting processing of services for other telephone calls.

3. The method of claim 2 including the step of adjusting a size of said allocated portion of fast memory based on a size of said different program prior to uploading said different program.

4. The method of claim 3 wherein the step of allocating said portion of fast memory and the step of adjusting the size of said allocated portion of fast memory comprises selecting a bank of said fast memory by selectively setting higher order address lines of said fast memory.

5. The method of claim 4 wherein an address space of said fast memory is larger than an addressing capability of said DSP and including the step of said DSP selectively setting higher order address lines of said fast memory prior to addressing said fast memory.

6. The method of claim 1 wherein each said program permits processing of a plurality of services including said required services and including the step of disabling portions of each said program which portions are for permitting processing of services which do not comprise said required services.

7. A method of providing multi-channel telephony services, comprising the steps of:
    a. receiving at a digital signal processor "DSP" an indication of a first telephone call on a first channel and services required for said first channel and an indication of a second telephone call on a second channel and services required for said second channel;
    b. based on said first channel required services indication, allocating a first portion of a fast memory to said first channel and uploading a first program for processing said first channel required services from a slow memory into said first portion of fast memory;
    c. based on said second channel required services indication, allocating a second portion of said fast memory to said second channel and uploading a second program for processing said second channel required services from a slow memory into said second portion of fast memory;
    d. in a time division fashion:
        (i) accessing said first portion of fast memory and, at said DSP, executing said first program in order to process said first channel required services; and
        (ii) accessing said second portion of fast memory and, at said DSP, executing said second program in order to process said second channel required services.

8. The method of claim 7 including the steps of receiving an indication of different services required for said first telephone call on said first channel and uploading a different program for processing said different required services from slow memory into said first portion of fast memory, whereby said different program overwrites said first program without affecting said second program.

9. The method of claim 8 including the step of adjusting a size of said first portion of fast memory based on a size of said different program prior to uploading said different program.

10. The method of claim 9 wherein the steps of allocating said first portion of fast memory, allocating said second portion of fast memory, and adjusting the size of said allocated first portion of fast memory comprises selecting a bank of said fast memory by selectively setting higher order address lines of said fast memory.

11. The method of claim 10 wherein an address space of said fast memory is larger than an addressing capability of said DSP and including the step of said DSP selectively setting higher order address lines of said fast memory prior to addressing said fast memory.

12. The method of claim 9 wherein said first program permits processing of a plurality of services including said first channel required services and including the step of disabling portions of said first program which portions are for permitting processing of services which do not comprise said first channel required services.

13. Signal processing apparatus for a multi-channel telephony system comprising:
    a digital signal processor "DSP" adapted for operative association with a host processor;
    a fast memory addressed by said DSP;
    a slow memory associated with said fast memory;
    said DSP for:
        (i) receiving from said host processor an indication of a plurality of telephone calls on a like plurality of channels and services required for each telephone call;
        (ii) for each channel of said plurality of channels, based on the required services indication for said each channel, allocating a portion of said fast memory to said each channel and uploading a program for processing said each channel required services from said slow memory into said allocated portion of fast memory;

(iii) in a time shared fashion amongst said plurality of channels, accessing each allocated portion of fast memory and executing said program stored therein in order to process said services.

14. The apparatus of claim 13 including a memory configuration register receiving a data input from said DSP and at least one selector input by an address line of said DSP and by a bank size configuration line of said memory configuration register, said at least one selector for selecting an input to connect to an output to an address line of said fast memory based on a control signal from said memory configuration register.

* * * * *